United States Patent
Fan et al.

(10) Patent No.: US 6,882,313 B1
(45) Date of Patent: Apr. 19, 2005

(54) DUAL PLATFORM LOCATION-RELEVANT SERVICE

(75) Inventors: Rodric C. Fan, Fremont, CA (US); Julia A. Langley, Menlo Park, CA (US); Edward D. Meczko, San Jose, CA (US); Kulbir S. Sandhu, San Jose, CA (US)

(73) Assignee: At Road, Inc., Fremont, CA (US)

( * ) Notice: Subject to any disclaimer, the term of this patent is extended or adjusted under 35 U.S.C. 154(b) by 0 days.

(21) Appl. No.: 09/599,053

(22) Filed: Jun. 21, 2000

(51) Int. Cl.⁷ .............................. G01S 3/02; G01S 5/14; H04Q 7/20
(52) U.S. Cl. .................. 342/457; 342/357.1; 455/456.3
(58) Field of Search ............................ 342/457, 357.06, 342/357.09, 357.1; 455/456.3

(56) References Cited

U.S. PATENT DOCUMENTS

| | | | | |
|---|---|---|---|---|
| 5,548,822 A | * | 8/1996 | Yogo | 455/68 |
| 5,794,164 A | * | 8/1998 | Beckert et al. | 455/456 |
| 5,835,907 A | * | 11/1998 | Newman | 340/7.5 |
| 5,938,721 A | * | 8/1999 | Dussell et al. | 701/211 |
| 5,959,577 A | * | 9/1999 | Fan et al. | 342/357.13 |
| 6,006,159 A | * | 12/1999 | Schmier et al. | 701/200 |
| 6,091,956 A | * | 7/2000 | Hollenberg | 455/456 |
| 6,091,957 A | | 7/2000 | Larkins et al. | 455/456 |
| 6,131,067 A | * | 10/2000 | Girerd et al. | 701/213 |
| 6,182,010 B1 | * | 1/2001 | Berstis | 701/211 |
| 6,240,365 B1 | * | 5/2001 | Bunn | 701/213 |
| 6,243,039 B1 | * | 6/2001 | Elliot | 342/457 |
| 6,246,935 B1 | * | 6/2001 | Buckley | 701/36 |
| 6,374,176 B1 | | 4/2002 | Schmier et al. | 701/200 |
| 6,385,541 B1 | * | 5/2002 | Blumberg et al. | 701/207 |
| 6,401,027 B1 | * | 6/2002 | Xu et al. | 701/117 |
| 6,408,307 B1 | * | 6/2002 | Semple et al. | 701/208 |
| 6,442,394 B1 | * | 8/2002 | Valentine et al. | 455/456.3 |
| 6,456,234 B1 | * | 9/2002 | Johnson | 342/357.09 |
| 6,549,768 B1 | * | 4/2003 | Fraccaroli | 455/456.3 |
| 6,662,016 B1 | * | 12/2003 | Buckham et al. | 455/457 |
| 6,677,894 B1 | * | 1/2004 | Sheynblat et al. | 342/357.1 |
| 2002/0072815 A | * | 12/2000 | McDonough et al. | 700/92 |

FOREIGN PATENT DOCUMENTS

| | | | | |
|---|---|---|---|---|
| WO | WO 96/11381 | 4/1996 | | G01C/21/20 |
| WO | WO 97/24005 | 7/1997 | | H04Q/7/22 |
| WO | WO 97/41654 | 11/1997 | | H04H/1/00 |
| WO | WO 98/00988 | 1/1998 | | H04Q/7/22 |
| WO | WO 98/57189 | 12/1998 | | G01S/5/10 |

OTHER PUBLICATIONS

US 6,731,928, 5/2004, Tanaka (withdrawn)*
Lind, R. et al, "The Network Vehicle—A Glimpse into the Future of Mobile Multi–Media", Proc of the 17th Digital Avionics Systems Conf., Nov. 1998, pp. 121/1–121/8, vol. 2.*

* cited by examiner

Primary Examiner—Gregory C. Issing
(74) Attorney, Agent, or Firm—Michael Shenker; MacPherson Kwok Chen & Heid LLP

(57) ABSTRACT

A location-relevant service system provides location-relevant information to, or performs location-relevant service for, a first mobile unit based on the location of a second mobile unit. In one instance, the first mobile unit is fixed on a vehicle, while the second mobile unit can be provided as a cellular phone. In another instance, the first mobile unit is provided with a display panel, so that authentication can be achieved through providing the displayed location information to a location-relevant service server using the second mobile unit.

10 Claims, 3 Drawing Sheets

DUAL PLATFORM LOCATION-RELEVANT SERVICE

BACKGROUND OF THE INVENTION

1. Field of the Invention

The present invention relates to a location-relevant service; in particular, the present invention relates to a location-relevant service accessible by multiple mobile devices.

2. Discussion of the Related Art

Location-relevant services, which provide information or perform services based on the geographical location of a mobile client, are becoming more available. A location-relevant service can be used, for example, by a trucking company to track the positions of its vehicles in service. Another application of location-relevant systems is to provide travel-related services (e.g., driving directions) based on the position of the client. One example of a location-relevant service is described, for example, in copending U.S. patent application "Method for Distribution of Locality-Relevant Information using a Network" ("Copending Application"), application Ser. No. 09/422,116, filed Oct. 20, 1999. To provide an example regarding the architecture and application of a location-relevant information system, the disclosure of the Copending Application is hereby incorporated by reference in its entirety.

Typically, a location-relevant system includes a location-relevant service server accessible by multiple mobile units over a communication system, which includes wireless links to the mobile units. The mobile units provide their positions based on a positioning system. The position of a mobile unit can be provided by, for example, the Global Positioning System (GPS) or, in a cellular telephone network, by a process called triangulation which is based on signal delays from system base stations of known fixed locations. Due to technology limitations at the present time, it is costly to integrate the capabilities of both positioning and wireless communication of such a mobile unit into a hand-held device. In addition, hand-held positioning devices are also typically less accurate than their more sophisticated bulky counterparts. Therefore, a mobile unit in a location-relevant service is typically fixedly installed on a vehicle. However, a mobile unit fixedly installed on a vehicle cannot provide the convenience and mobility of a hand-held unit.

Another desirable application that is not known in the prior art is accessing from a mobile unit location-relevant service based on the position of another mobile unit.

SUMMARY OF THE INVENTION

The present invention provides a location-relevant service system which includes (a) a location-relevant service server accessible over a data network (e.g., the Internet); (b) a first mobile unit coupled to the data network over a first wireless link which provides a position of the first mobile unit over the wireless link to the location-relevant service server; and (c) a second mobile unit coupled to the data network which receives from the location-relevant service server location-relevant service based on the position of the first mobile unit. In one embodiment, the second mobile unit couples to the location-relevant service server over a second wireless link independent of the first wireless link. Alternatively, the first and second mobile units can share the first wireless link, which can be provided by either of the mobile units. Further, the first and second units can also communicate over a direct wired or wireless link. In a wired link environment, the wired link can be provided through a docking station in the first mobile unit adapted for accommodating the second mobile unit. The electrical interface between the first and second mobile units under such an arrangement can be provided by a standard interface, such as an industry standard serial bus commonly found in portable devices, such as a cellular telephone, lap top computer or a personal digital assistant.

The location-relevant service system of the present invention can operate in at least two modes: on-demand or "pushed." Under on-demand operation, location-relevant service is provided in response to a query received from the second mobile unit. Alternatively, under the pushed operation either the second mobile unit or a non-mobile unit can request a selected location-relevant service to be provided to the second mobile unit upon occurrence of predetermined events, or satisfaction of certain conditions (e.g., during a specified time period).

Location-relevant services can provide such information as traffic conditions, entertainment information, or travel-related information (e.g., detailed driving directions) relevant to the locality of the first mobile unit. Alternatively, the first mobile unit can be installed in conjunction with a monitor that monitors the operation conditions of a vehicle. In that configuration, the first mobile unit can report operations or maintenance conditions of the vehicle to other users (e.g., the second mobile unit) through the location-relevant service server.

In one application, a user who is seeking a real property can specify in the location-relevant service server a search request for a list of real properties for inspection. The search result can be pushed to his cellular phone (i.e., second mobile unit, in this instance) based on the position of the receiver (e.g. GPS receiver) installed in his vehicle, when he arrives at the vicinity and requests from the second mobile unit his search results.

In addition to the GPS system, the present invention can also be used in conjunction with a terrestrial triangulation-based system. In one embodiment, the first mobile unit receives or computes its position using terrestrial triangulation.

In one application, the two mobile units can be used to authenticate a user in a business transaction. For example, the user conducting business on a cellular telephone can be authenticated by providing the location-relevant service server the position of the first mobile unit. (For example, the user is conducting this transaction from his vehicle, where the first mobile unit is installed). The location-relevant service server can independently verify this position by querying the first mobile unit. In such an application, if the first mobile unit is provided a display, the user can read the position off the display and key in the position information using the keypad on the second mobile unit (e.g., a cellular telephone).

The present invention is better understood upon consideration of the detailed description below and the accompanying drawings.

BRIEF DESCRIPTION OF THE DRAWINGS

FIG. 3 illustrates a "push-based" operation of

DETAILED DESCRIPTION OF THE PREFERRED EMBODIMENTS

Figure 1:
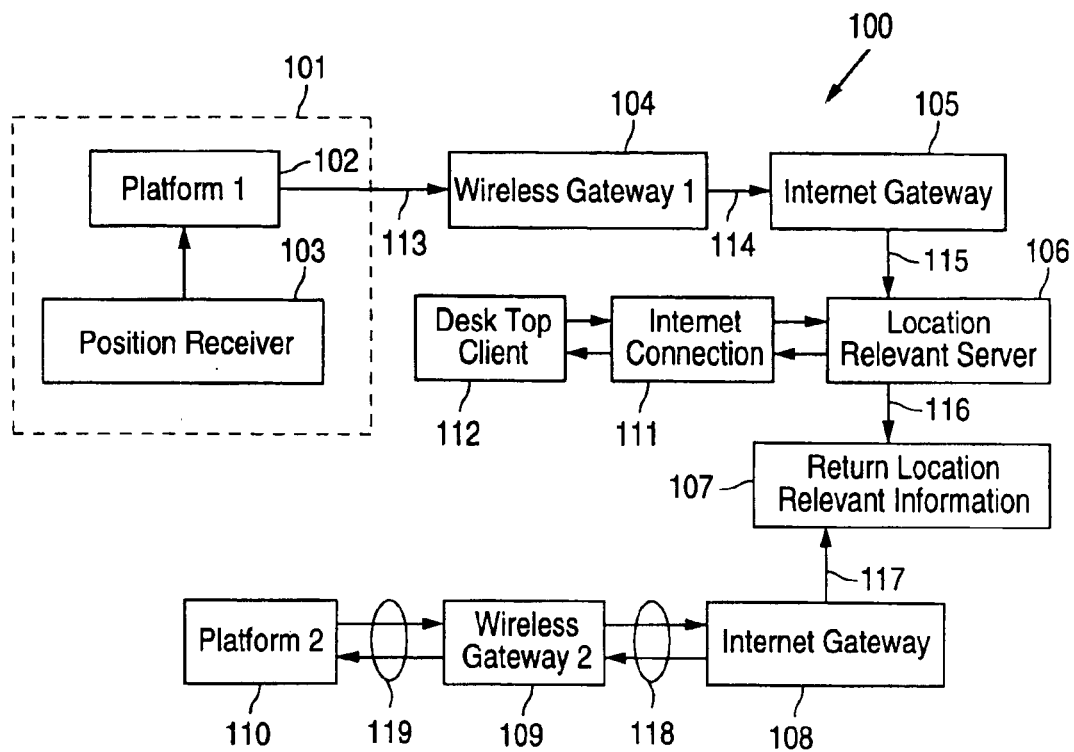
FIG. 1 shows one embodiment of the present invention in a location-relevant service system 100.

The present invention provides access to a location-relevant service from a mobile communication device based on the position of another mobile unit. FIG. 1 shows one embodiment of the present invention in a location-relevant service system 100. As shown in FIG. 1, a conventional mobile unit 101 for accessing location-relevant service is in communication in a conventional manner with a location-relevant service server 106 over a communication or data network, such as the Internet. Mobile unit 101 consists of both position receiver 103 and communication portion 102. In addition, mobile unit 101 may include a visual display panel for displaying the position information received at position receiver 103. Position information can be expressed as actual longitudes and latitudes, or simply a location code. In addition, the "age" of the location information (i.e., the elapsed time since the last time mobile unit 101 computes its position) can also be displayed.

Figure 6:
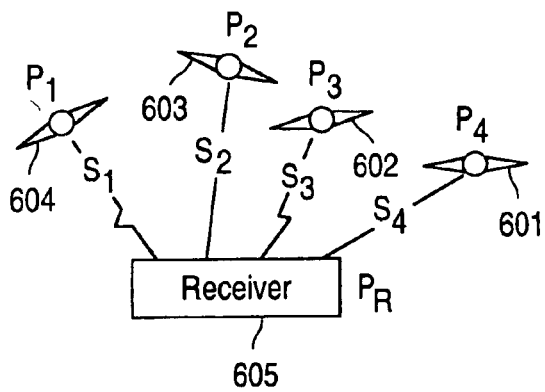
FIG. 6 illustrates a method for obtaining a receiver position based on the global positioning system (GPS).
Figure 7:
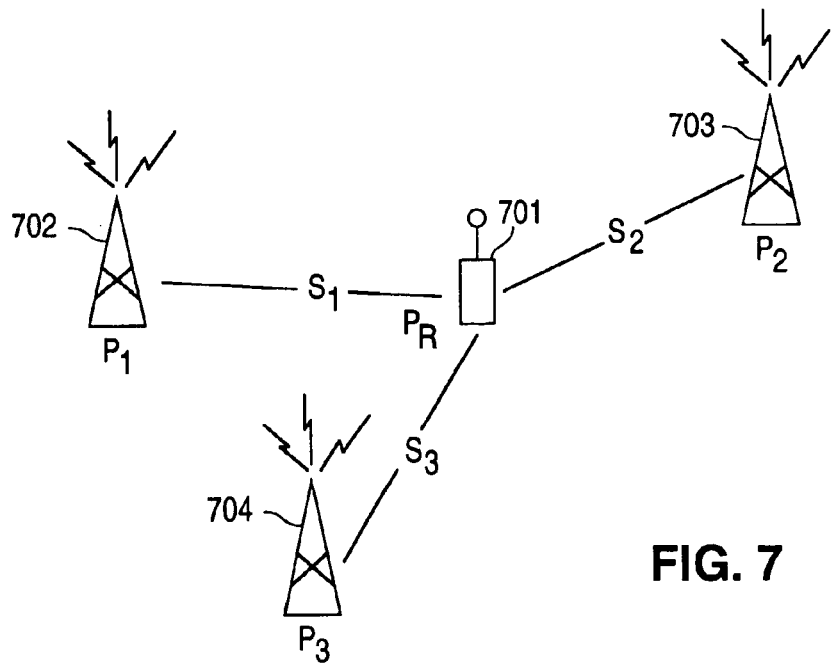
FIG. 7 illustrates a method for obtaining a receiver position based on terrestrial triangulation.

As illustrated by system 100, mobile unit 101 can send its position data, for example, over a wireless link 113 with wireless gateway 104. Positional data can be received, for example, from a GPS system or a terrestrial triangulation-gased system. FIGS. 6 and 7 illustrate methods for obtaining a receiver position based on a global positioning system and a terrestrial triangulation system, respectively. As shown in FIG. 6, in a GPS system, receiver 605 receives from satellites 601–604 respective positions P1, P2, P3 and P4 and their times of transmission. Using its local time t, receiver 605 computes distances S1, S2, S3, and S4, which are respective distances of satellites 601–604 from receiver 605. Position PR of receiver 605 can then be computed conventionally as a function of P1, P2, P3, P4, S1, S2, S3 and S4. As shown in FIG. 7, under a terrestrial triangulation method, land-based transmitters 702–704. The position PR of receiver 701 can be computed conventionally as a function of P1, P2, P3, S1, S2, and S3. In addition to the computed position of mobile device 101, the time at which the position was obtained can also be provided to location-relevant service 106. This information would allow the user or location-relevant service server 106 to determine whether or not a more or less frequent update is necessary. The direction of travel of mobile unit 101 can also be provided to location-relevant service server 106. (Direction of travel can be used, for example, in a driving direction service to provide more accurate "turn by turn" driving directions—i.e., additional turns may be necessary to reorient the vehicle towards the destination.)

Wireless gateway 104 relays the position data from mobile unit 101 over the Internet to location-relevant server 106 over via internet gateway 105. As in the system described in the Copending Application incorporated by reference above, location-relevant server 106 is accessible over the Internet by desk top client device 112 (e.g., a desktop computer) using conventional internet connection 111. Desktop client device 112 can be used to control subsequent processing of the position data received at location-relevant service server 106.

Unlike prior art systems, however, system 100 allows a second mobile device 110 (e.g., a cellular telephone, a personal digital assistant, or a laptop computer) to access information or service provided by location-relevant service server based on the position of mobile unit 101. As shown in FIG. 1, location-relevant service server 106 provides location-relevant information to mobile device 110 by making such information available at an information depository 107 (e.g., a web server) accessible by mobile device 110 through wireless gateway 109 and internet gateway 108 via wireless link 119 and conventional data communication links 117 and 118. In one embodiment, a user can access information depository 107 using a browser adapted for a wireless communication protocol (e.g., WAP). (Although shown here as separate units, information depository 107 and location-relevant service server 106 can be implemented by the same server unit).

To access location-relevant service based on the position of mobile unit 101, the user of mobile device 110 provides authentication information (e.g., user identification and password) to location-relevant service server 106. After establishing that the user of mobile device 110 has the requisite rights, location-relevant server 106 provides location-relevant service to the user of mobile device 110.

Figure 2:
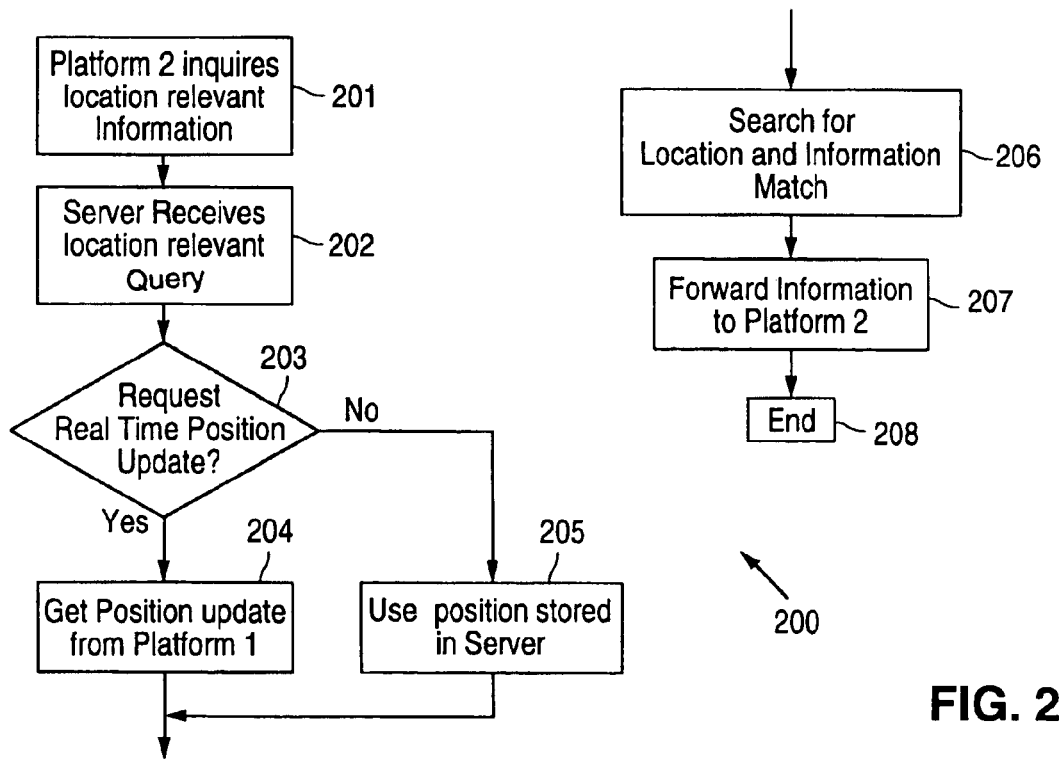
FIG. 2 illustrates a query-based operation of one embodiment of the present invention.

System 100 can operate under at least two modes of operations: "query-based" and "push-based" operations. FIG. 2 illustrates a query-based operation of one embodiment of the present invention. As shown in FIG. 2, under a query-based operation, location-relevant service is provided only when the user of mobile device 110 sends out a request for location-relevant service (step 201). At step 202, where location-relevant service server 106 receives the service request, it determines (step 203) if it requires an update of the position of mobile device 101. If an updated position is required, a request is sent to mobile device 101 to obtain mobile device 101's current position. Otherwise, at step 205, the most recently acquired position information stored at location-relevant service server 106 is used. Regardless of whether an update is obtained, the position data is used to render location-relevant service (step 206). Results or returned information is then provided to the user at mobile device 110 (step 207).

Figure 3:
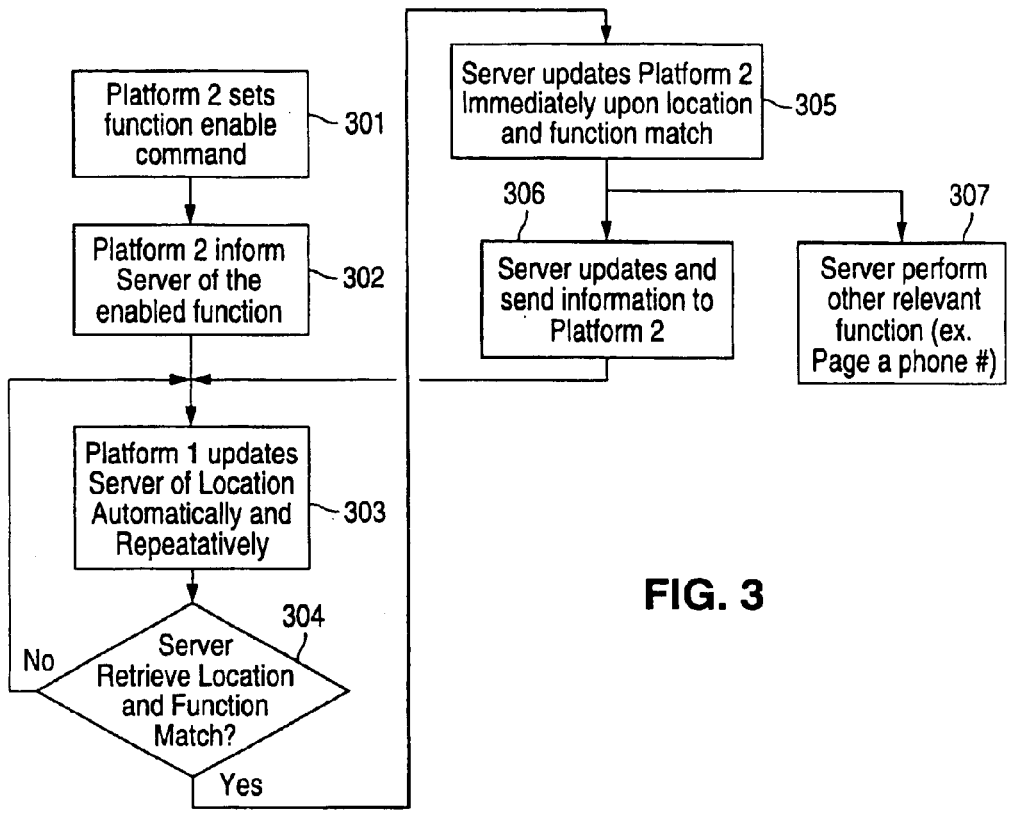

FIG. 3 illustrates a "push-based" operation of one embodiment of the present invention. Under the push-based operation of FIG. 3, at steps 301 and 302, mobile device 110 receives a command for a selected location-relevant service and enables the corresponding service at location-relevant service server 106. The selected service can be activated according to some conditions, such as a specified position reported by mobile unit 101. At the same time, at regular time intervals, mobile unit 101 provides its current position to location-relevant service server 106. Location-relevant service server 106 waits on the specified conditions for triggering the selected location-relevant service (steps 303 and 304). When the conditions for the selected service are met, the selected service is performed in accordance with the position of mobile unit 101 (step 305). Depending on whether the selected service is to remain active (e.g., prior to the expiration of a specified time period), location-relevant service server 106 returns to wait for the triggering conditions (step 306), or proceeds with other location-relevant services (step 307), as required.

Examples of other location-relevant information that can be provided includes: traffic, operating or maintenance conditions regarding the vehicle, entertainment (e.g., movies or shows played at nearby cinemas or theaters) or travel-related information (e.g., locations of nearby hotels, points of interests, gas stations, restaurants, driving directions etc.) In system 100, for example, prior to a trip, a user can specify from his desktop personal computer a list of location-related service requests. The user seeking to buy real estate, for example, may set requests for locations of open-house events, which will then be downloaded to mobile device 110 in the form of a paging message or an email, when mobile device 101—which is installed in the user's car—arrives at the specified geographical vicinity.

The information at location-relevant service server 106 can be shared among users for many purposes. For example, the present invention provides a method for authentication for on-line transactions. For example, a user completing an on-line transaction with mobile device 110 can sign the transaction using the position data displayed on the display panel of mobile unit 101. The elapsed time since the position data was obtained can also be displayed on the display panel and used to achieve further robustness. The other party to the transaction can authenticate the user through location-relevant service server 106, which independently queries mobile unit 101 to obtain its position.

Figure 4:
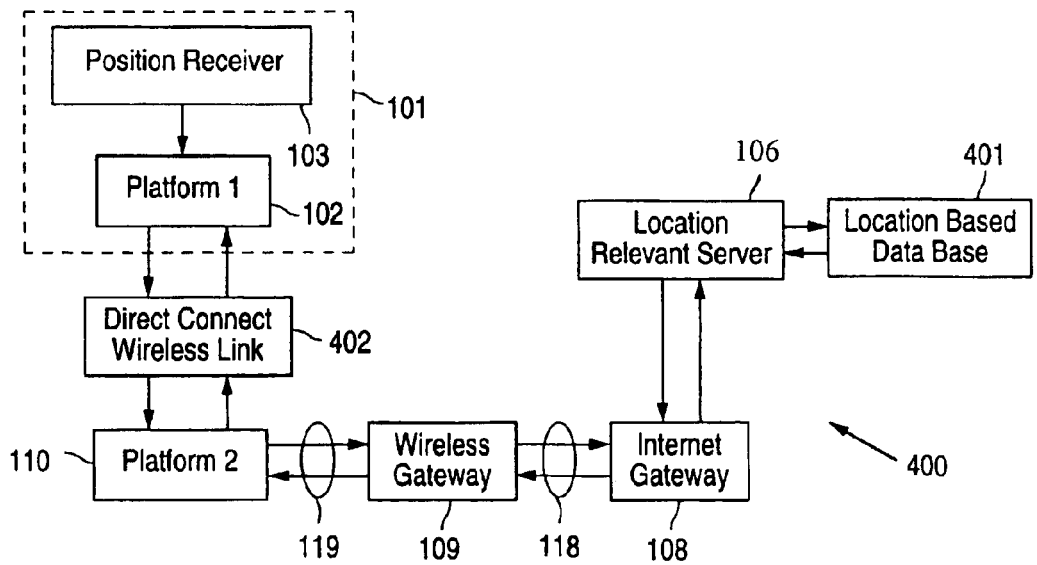
FIG. 4 shows a second embodiment of the present invention.
Figure 5:
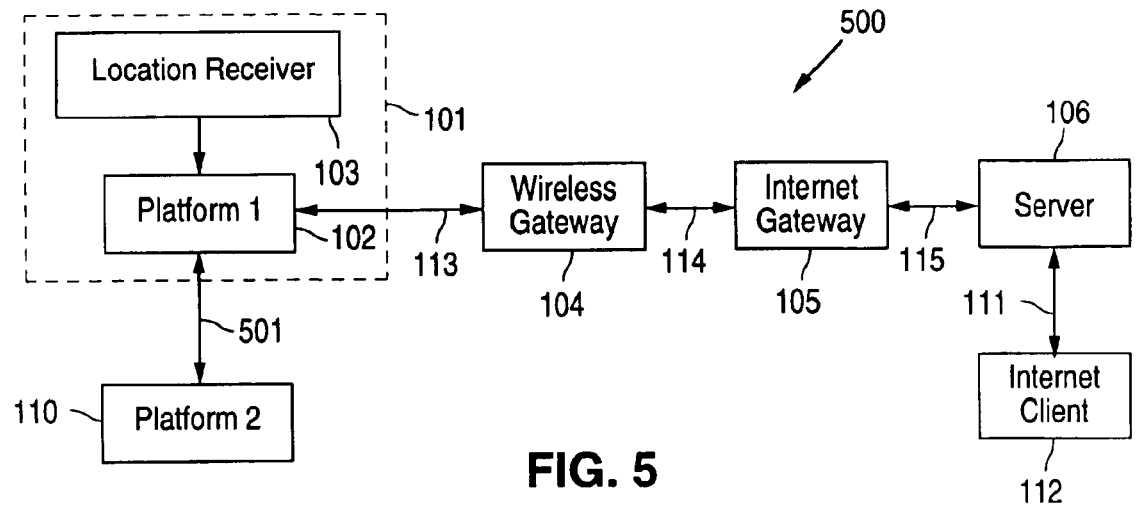
FIG. 5 shows a third embodiment of the present invention.

In system 100, mobile unit 101 and mobile device 10 communicate via separate wireless links 113 and 119. However, the operations described above and the attendant benefits can similarly be achieved using systems 400 and 500 of FIGS. 4 and 5, respectively, in alternative embodiments of the present invention. To simplify the following discussion and to avoid repetition, like elements in FIGS. 1, 4 and 5 are provided like reference numerals. In each of systems 400 and 500, rather than mobile unit 101 sending positional data to location-relevant service server 106 via an independent communication link, the position information data of mobile unit 101 and communication between mobile device 110 and location-relevant service server 106 share a common wireless link and an internet gateway. In system 400, mobile unit 101 and mobile device 110 communicate with each other over wireless link 402, and communicate with location-relevant service server 106 through mobile device 110. Alternatively, as shown in FIG. 5, mobile unit 101 and mobile device 110 communicate over a wired link 501, and communicate with location-relevant service server 106 through mobile unit 101's wireless link 113. Wired link 501 can be implemented, for example, by a docking station through a standard interface. For example, if mobile unit 101 is a lap top or a personal digital assistant, such an interface can be provided by a 1394 serial bus interface. As in FIG. 1, in systems 400 and 500, location-relevant service server 107 can be accessed from non-mobile or desktop client 112.

The above detailed description is provided to illustrate specific embodiments of the present invention and is not intended to be limiting. Numerous modifications and variations within the scope of the present invention are possible. The present invention is set forth in the following claims.

What is claimed is:

1. A location-relevant service system comprising a location-relevant service server for receiving and storing location information of a first mobile device, wherein the first mobile device comprises a receiver for determining the location information of the first mobile device, wherein:

the first mobile device is coupled via a first communications link to a second mobile device;

the coupled first and second mobile devices are coupled via a second communications link to the location-relevant service server such that:

the location-relevant service server is connected to receive the location information of the first mobile device via the second communications link;

the location-relevant service server is connected to receive a request for the location-relevant service from the second mobile device via the second communications link, the location-relevant service being associated with a specified position; and the location-relevant service server is connected to pass the requested location-relevant service to the second mobile device via the second communications link based on the position of said first mobile device.

2. The location-relevant service system of claim 1 wherein the second communications link connects directly to the first mobile device, and information is passed to the second mobile device via the first mobile device.

3. The location relevant service system of claim 1 wherein the second communications link connects directly to the second mobile device, and information is passed to the first mobile device via the second mobile device.

4. The location relevant service system of claim 1 wherein the request for location-relevant service by the second mobile device comprises the location of the first mobile device as an authentication for the request.

5. The location relevant service system of claim 1 wherein the first mobile device is mounted in a motor vehicle and the second mobile device comprises a wireless telephony handset transceiver.

6. A method of providing location-relevant service, wherein a location of a first mobile device is determined and provided to a location-relevant service server, wherein:

the first mobile device is coupled via a first communications link to a second mobile device; and the coupled first and second mobile devices are coupled via a second communications link to the location-relevant service server;

the method comprising:

receiving at the location-relevant service server, via the second communications link, the location information of the first mobile device;

receiving at the location-relevant service server, via the second communications link, a request from the second mobile device for the location-relevant service, the location-relevant service being associated with a specified position; and passing from the location-relevant service server to the second mobile device, via the second communications link, the requested location-relevant service based on the position of said first mobile device.

7. The method of claim 6 wherein the second communications link connects directly to the first mobile device, and information is passed to the second mobile device via the first mobile device.

8. The method of claim 6 wherein the second communications link connects directly to the second mobile device, and information is passed to thee device via the second mobile device.

9. The method of claim 6 wherein the request for location-relevant service by the second mobile device comprises the location of the first mobile device as an authentication request.

10. The method of claim 6 wherein the first mobile device is mounted in a motor vehicle and the second mobile device comprises a wireless telephony handset transceiver.

* * * * *

UNITED STATES PATENT AND TRADEMARK OFFICE
CERTIFICATE OF CORRECTION

| | |
|---|---|
| PATENT NO. | : 6,882,313 B1 |
| APPLICATION NO. | : 09/599053 |
| DATED | : April 19, 2005 |
| INVENTOR(S) | : Rodric C. Fan et al. |

It is certified that error appears in the above-identified patent and that said Letters Patent is hereby corrected as shown below:

Column 6, line 56 delete "thee" and insert --the first mobile--

Signed and Sealed this

Third Day of October, 2006

JON W. DUDAS
*Director of the United States Patent and Trademark Office*